July 25, 1944. C. M. VERHAGEN 2,354,341
RUBBER GLAZING STRIP FOR MULTIPLE GLASS SASH
Filed Jan. 20, 1940
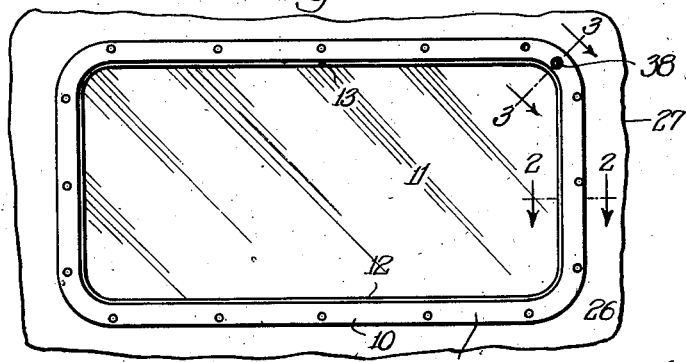
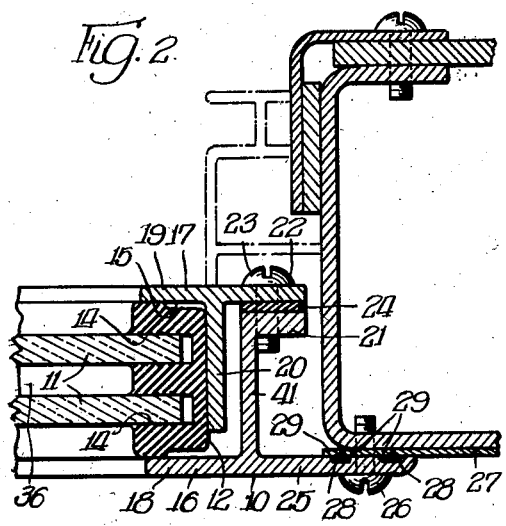
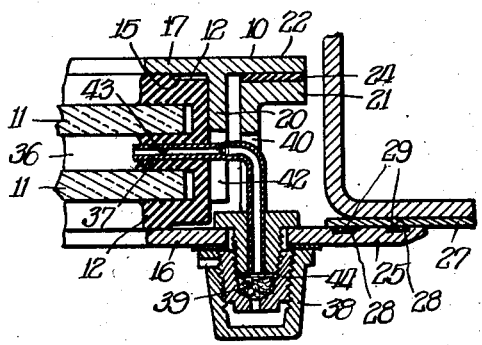
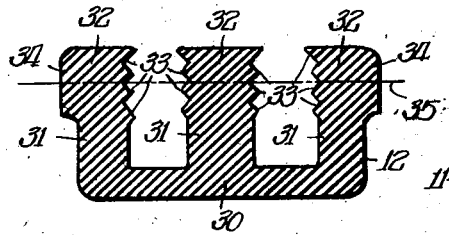
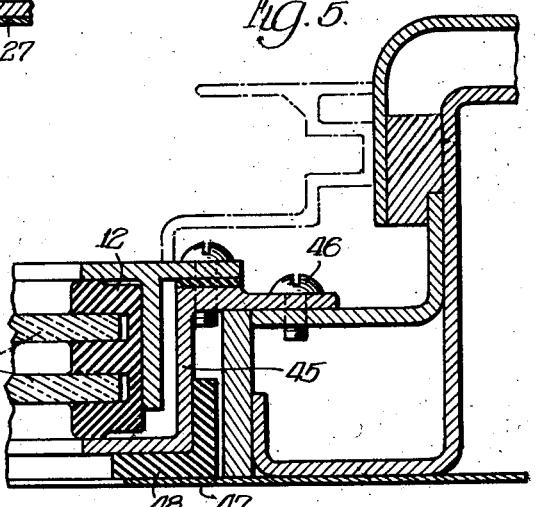
INVENTOR.
Christian M. Verhagen,
BY Cromwell, Greist & Warden
ATTORNEYS.

Patented July 25, 1944

2,354,341

UNITED STATES PATENT OFFICE 2,354,341

RUBBER GLAZING STRIP FOR MULTIPLE GLASS SASH

Christian M. Verhagen, Elkhart, Ind., assignor to The Adlake Company, Chicago, Ill., a corporation of Illinois Application January 20, 1940, Serial No. 314,813

9 Claims. (Cl. 189—64)

The present invention relates to multiple glass sash of the type used in air-conditioned railway cars, buses and other vehicles.

The object of the invention is to provide, in a multiple glass sash of this type, an improved rubber glazing strip, which strip affords adequate support for the glass panes, and is inexpensive, simple, easy to apply, and absolutely weathertight.

While the foregoing statements are indicative of the nature of the invention, other more specific objects and advantages will be apparent upon a full understanding of the features of novelty in the improved glazing strip.

In the accompanying drawing:

Fig. 1 is an outside face view of a double glass car window sash equipped with a rubber glazing strip constructed in accordance with the invention;

Fig. 2 is a section through one side of the sash, taken on the line 2—2 of Fig. 1;

Fig. 3 is a similar section, taken on the line 3—3 of Fig. 1;

Fig. 4 is a section through the rubber glazing strip, before application to the sash; and Fig. 5 is a section, corresponding to Fig. 2, showing a modified sash structure equipped with the same rubber glazing strip.

The sash shown in Figs. 1, 2 and 3 of the drawing consists of a metal frame 10, two glass panes 11, and a rubber glazing strip 12. The strip 12 is of one-piece construction, and preferably extends continuously about the sash, with a cemented or vulcanized butt joint 13 at the center of the top of the sash. The edges of the panes 11 are positioned in closely fitting grooves 14 in the strip 12, and the strip 12 is in turn positioned in a relatively wide channel 15 provided in the frame 10.

The frame 10 is of two-part construction. The outer part 16 is preferably of generally Z-shaped cross section, while the inner part 17 is preferably of T-shaped cross section. The parts 16 and 17 are assembled as shown in Fig. 2—with the flanges 18 and 19 of the parts forming the side walls of the channel 15, with the flange 20 of the part 17 forming a support for the back of the rubber glazing strip 12, and with the slightly spaced flanges 21 and 22 of the parts adjustably drawn together by bolts 23 on an interposed sealing strip 24 of rubber, felt, cork or other readily compressible material. The outer part 16 is provided with a supplemental flange 25 which is attached by bolts 26 to the edge of the window opening, against the outside sheathing 27 of the car. The flange 25 is preferably provided with longitudinally extending grooves 28 which are filled with a suitable sealing compound 29.

The glazing strip 12 is characterized by a cross web 30, and by a plurality of flanges 31 at right angles to the cross web 30 for interleaved association with the panes 11 and the sides of the channel 15. The flanges 31 are provided adjacent their free edges with sealing portions 32 of increased thickness, in which the compressive forces exerted on the strip 12 by the sides of the channel 15 are all localized. The faces of the enlarged sealing portions 32 which engage with the panes 11 are preferably corrugated longitudinally to provide a plurality of sealing ribs 33, while the faces of the sealing portions which engage with the sides of the channel 15 are preferably single flat-topped beads 34. The ribs 33 and the beads 34 are all centered in a plane 35 which is parallel to the cross web 30 of the strip and passes through the clamping flanges 18 and 19 of the frame 10 just inwardly of the free edges of such flanges.

By employing a rubber glazing strip having these characteristics, the edges of the glass panes 11 will be completely sealed off by the application of but a comparatively small clamping pressure to the strip. The rubber glazing strip will also function efficiently as an insulator. By making the frame 10 in the manner shown, the inner and outer frame parts 16 and 17 are kept out of direct contact with each other, thereby further decreasing heat or cold transfer.

To re-glaze the sash it is merely necessary to unscrew the bolts 23 and withdraw the frame part 17 from the frame part 16, whereupon the glass panes 11, with the rubber glazing strip 12, can be removed as a unit from the shelf-like supporting flange 20. The side flanges of the strip 12 may then be flexed away from the panes to permit removal of the latter.

The sealed-off space 36 between the panes 11 may be vented if desired by an L-shaped breather tube 37 located near one of the upper corners of the sash, which tube opens to the atmosphere through a perforated cap 38 which contains an air filter 39. The breather tube 37 may pass through an aperture 40 in the flange 41 of the outer frame part 16 and through a slot 42 in the flange 20 of the inner frame part 17 into a bore 43 provided in the center flange of the rubber glazing strip 12. By unscrewing the cap 38, and then unscrewing an inside cap 44, the breather tube 37 may be withdrawn without interference from the outer frame part 16 when the inner frame part 17 is withdrawn.

In Fig. 5 the same specially designed rubber glazing strip 12 is shown applied to a two-part sash frame of slightly modified construction. In this modified frame structure the outer part 45 is applied from the inside of the window opening and fastened in place by bolts 46, the bolts 46 forcing the outer frame part 45 against the car sheathing 47 on an interposed sealing strip 48.

In both of these assemblies, the usual curtain guides (shown in dot-dash lines) may be applied to the sides of the window from the inside after the inner frame part has been secured to the outer frame part.

I claim:

1. In a multiple glass sash, a one-piece rubber glazing strip for insertion in a channel in the frame of the sash in clamped engagement with the sides of the channel, said strip being characterized by a cross web and by a plurality of solid integral flanges at right angles to the cross web for solidly interleaved association with the panes of glass and the sides of the channel, and the flanges on said strip being provided adjacent their edges with solid spacing and sealing portions of increased thickness and substantial width, in which solid spacing and sealing portions the compression on the strip exerted by the sides of the channel is localized to support as well as seal the panes.

2. In a multiple glass sash, a one-piece rubber glazing strip for insertion in a channel in the frame of the sash in clamped engagement with the sides of the channel, said strip being characterized by a cross web and by a plurality of solid integral flanges at right angles to the cross web for solidly interleaved association with the panes of glass and the sides of the channel, and the flanges on said strip being provided adjacent their edges with solid spacing and sealing portions of increased thickness and substantial width, in which solid spacing and sealing portions the compression on the strip exerted by the sides of the channel is localized to support as well as seal the panes, the surfaces of the sealing portions on the sides of the flanges facing the panes of glass being provided with groups of closely arranged longitudinally extending ribs, and the surfaces of the sealing portions on the sides of the flanges facing the sides of the channel being provided with single flat topped beads.

3. In a multiple glass sash, a one-piece rubber glazing strip for insertion in a channel in the frame of the sash in clamped engagement with the sides of the channel, said strip being characterized by a cross web and by a plurality of solid integral flanges at right angles to the cross web for solidly interleaved association with the panes of glass and the sides of the channel, and the flanges on said strip being provided adjacent their edges with solid spacing and sealing portions of increased thickness and substantial width, in which solid spacing and sealing portions the compression on the strip exerted by the sides of the channel is localized to support as well as seal the panes, the surfaces of the sealing portions on the sides of the flanges facing the panes of glass being provided with groups of closely arranged longitudinally extending ribs, and the surfaces of the sealing portions on the sides of the flanges facing the sides of the channel being provided with single flat topped beads, and said beads and groups of ribs being centered in a common plane parallel to the cross web of the strip.

4. In a multiple glass sash, a metal frame containing a glazing channel, a single rubber glazing strip in the channel containing two or more grooves separated by one or more spacing and sealing flanges, and two or more glass panes in the grooves, the sides of the glazing strip being compressed by the sides of the channel adjacent the outer edges only of the glazing strip, said frame being composed of separable outer and inner parts, and said parts being provided with substantially spaced parallel flanges which form the side walls of the channel in the frame, other more closely spaced parallel flanges at right angles to the first mentioned flanges behind the rubber glazing strip in the channel, and still other closely spaced parallel flanges which are parallel to the first mentioned flanges, and clamping bolts carried by the last mentioned flanges for drawing the first mentioned flanges toward each other to compress the rubber glazing strip, whereby to provide an air-tight seal between the panes of glass and the flange or flanges spacing the same.

5. In a multiple glass sash, a metal frame containing a glazing channel, a rubber glazing strip in the channel containing two or more grooves, and two or more glass panes in the grooves, said frame being composed of separable outer and inner parts, and said parts being provided with substantially spaced parallel flanges which form the side walls of the channel in the frame, other more closely spaced parallel flanges at right angles to the first mentioned flanges behind the rubber glazing strip in the channel, and still other closely spaced parallel flanges which are parallel to the first mentioned flanges, clamping bolts carried by the last mentioned flanges for drawing the first mentioned flanges toward each other to compress the rubber glazing strip, and the outer frame part being additionally provided with a flange parallel to the first mentioned flanges for mounting the assembly in a window opening.

6. In a double glass sash, the combination with two closely spaced parallel panes of glass, and a frame for the same presenting a channel, of a one-piece rubber glazing strip in the channel in tightly clamped engagement with the sides of the latter, said glazing strip being characterized by a cross web and by three solid integral flanges at right angles to the cross web in solidly interleaved association with the panes of glass and the sides of the channel, the two side flanges of the glazing strip being provided adjacent their edges with laterally enlarged portions in which the clamping pressure is localized and through which such pressure is transmitted from the sides of the channel to the panes of glass and the interposed center flange, said laterally enlarged portions serving to relieve the glazing strip from the transmission of any substantial clamping pressure from the sides of the channel at all points inwardly of said portions.

7. In a double glass sash, the combination with two closely spaced parallel panes of glass, and a frame for the same presenting a channel, of a one-piece rubber glazing strip in the channel in tightly clamped engagement with the sides of the latter, said glazing strip being characterized by a cross web and by three solid integral flanges at right angles to the cross web in solidly interleaved association with the panes of glass and the sides of the channel, the two side flanges of the glazing strip being provided adjacent their edges with laterally enlarged portions in which the clamping pressure is localized and through which such pressure is transmitted from the sides of the channel to the panes of glass and the interposed center flange, said glazing strip being spaced from the sides of the channel inwardly of the laterally enlarged portions of the side flanges.

8. In a double glass sash, the combination with two closely spaced parallel panes of glass, and a frame for the same presenting a channel, of a one-piece rubber glazing strip in the channel in tightly clamped engagement with the sides of the latter, said glazing strip being characterized by a cross web and by three solid integral flanges at right angles to the cross web in solidly interleaved association with the panes of glass and the sides of the channel, the two side flanges of the glazing strip being provided adjacent their edges with laterally enlarged portions in which the clamping pressure is localized and through which such pressure is transmitted from the sides of the channel to the panes of glass and the interposed center flange, said laterally enlarged portions serving to relieve the glazing strip from the transmission of any substantial clamping pressure from the sides of the channel at all points inwardly of said portions, the surfaces of the center and side flanges which engage with the panes of glass being serrated in parallel planes, and the surfaces of the side flanges which engage with the sides of the channel being substantially flat in parallel planes.

9. In a double glass sash, the combination with two closely spaced parallel panes of glass, and a frame for the same presenting a channel, of a one-piece rubber glazing strip in the channel in tightly clamped engagement with the sides of the latter, said glazing strip being characterized by a cross web and by three solid integral flanges at right angles to the cross web in solidly interleaved association with the panes of glass and the sides of the channel, the two side flanges of the glazing strip being provided on their outer sides adjacent their edges with laterally enlarged portions in which the clamping pressure is localized and through which such pressure is transmitted from the sides of the channel to the panes of glass and the interposed center flange.

CHRISTIAN M. VERHAGEN.